(12) United States Patent
Beck (10) Patent No.: US 7,021,434 B2
(45) Date of Patent: Apr. 4, 2006

(54) SELF-PUMPING HYDROPNEUMATIC SUSPENSION STRUT

(75) Inventor: Hubert Beck, Eitorf (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/884,104

(22) Filed: Jul. 2, 2004

(65) Prior Publication Data

US 2005/0001402 A1    Jan. 6, 2005

(30) Foreign Application Priority Data

Jul. 2, 2003    (DE) .............................. 103 29 746

(51) Int. Cl.
*F16F 9/24*    (2006.01)
(52) U.S. Cl. .................. 188/297; 188/301; 188/315; 188/322.21; 267/64.17; 267/DIG. 2
(58) Field of Classification Search .......... 267/DIG. 2, 267/64.17, DIG. 2 X, 64.17 X; 188/301, 188/284, 297, 304, 314, 315, 322.19, 322.21, 188/301 X, 315 X
See application file for complete search history.

(56) References Cited

U.S. PATENT DOCUMENTS

| 4,368,878 | A | * | 1/1983 | Meller et al. ............ 267/64.17 |
| 4,469,010 | A | * | 9/1984 | Skover et al. ................. 91/408 |
| 4,502,672 | A | | 3/1985 | Meller et al. |
| 5,797,594 | A | * | 8/1998 | Sekine et al. ............ 267/64.17 |
| 2002/0030311 | A1 | * | 3/2002 | Beck et al. ............... 267/64.11 |
| 2002/0105118 | A1 | * | 8/2002 | Beck ........................ 267/64.27 |

* cited by examiner

Primary Examiner—Devon C. Kramer
(74) Attorney, Agent, or Firm—Cohen, Pontani, Lieberman & Pavane

(57) ABSTRACT

Self-pumping hydropneumatic suspension strut with internal height control, in particular for motor vehicles with a work cylinder which is filled with oil and is under pressure by at least one gas cushion which is arranged in a high-pressure chamber and which acts as a spring, the work cylinder being divided into two work spaces by a work piston supported by a hollow piston rod, with a piston pump which is driven by the spring movements and conveys oil out of a low-pressure chamber into the work space connected to the high-pressure chamber and connects the work space connected to the high-pressure chamber to the low-pressure chamber by a regulating opening which is closable depending on the position of the work piston in the work cylinder, wherein a flow connection running through an intermediate wall and opening out below the surface of the oil is provided between the pump space and the low-pressure chamber, wherein the flow connection is arranged in the intermediate wall and has at least one bore hole in the area of the low-pressure chamber for receiving a suction tube.

5 Claims, 8 Drawing Sheets

Prior Art

PRIOR ART

PRIOR ART

SELF-PUMPING HYDROPNEUMATIC SUSPENSION STRUT

CROSS REFERENCE TO RELATED APPLICATIONS

The application claims priority under 35 U.S.C. §119 to German application DE 103 29 746.4 filed Jul. 2, 2003.

BACKGROUND OF THE INVENTION

1. Field of the Invention

The invention is directed to a self-pumping hydropneumatic suspension strut with internal height control, in particular for motor vehicles with a work cylinder which is filled with oil and is under pressure by at least one gas cushion which is arranged in a high-pressure chamber and which acts as a spring, the work cylinder being divided into two work spaces by a work piston supported by a hollow piston rod, with a piston pump which is driven by the spring movements and conveys oil out of a low-pressure chamber into the work space connected to the high-pressure chamber and connects the work space connected to the high-pressure chamber to the low-pressure chamber by a regulating opening which is closable depending on the position of the work piston in the work cylinder, wherein a flow connection running through an intermediate wall and opening out below the surface of the oil is provided between the pump space and the low-pressure chamber.

2. Description of the Related Art

Self-pumping hydropneumatic suspension struts with internal height control in which the work cylinder is under the pressure of at least one gas cushion arranged in a high-pressure chamber and acting as a spring are already known (EP 0.033.839 A2). Together with a pump rod, the hollow piston rod forms a piston pump so that a damping medium is conveyed out of a low-pressure chamber into the work space connected to the high-pressure chamber by means of the spring movements of the vehicle body relative to the vehicle chassis. This suspension strut is a mono-tube construction in which the high-pressure chamber is arranged axially behind the work spaces in the outer tube and wherein this high-pressure chamber separates the damping medium from the gas under pressure by a dividing piston. The high-pressure chamber and the low-pressure chamber are separated from one another by an intermediate wall which has the additional object of holding the pump rod in a springing manner. The springing retention of the pump rod serves to reduce the susceptibility of the pump to shocks. This embodiment form is disadvantageous in that the suction tube exiting from the low-pressure chamber penetrates the intermediate wall and subsequently opens out into the pump chamber again through the intermediate wall. This design requires a relatively large outer diameter and, so as not to further enlarge the outer diameter, the suction tube is tightly glued into the intermediate wall. Great stress is placed upon this glue connection due to the high pressure in the high-pressure chamber and the springing pump rod movement. The helical construction of the suction tube has a high suction resistance with respect to the total length, particularly in cold temperatures, and consequently would have to have a correspondingly large clear inner diameter so that an increased outer diameter of the overall suspension strut would have to be taken into account again.

SUMMARY OF THE INVENTION

The invention may provide a self-pumping hydropneumatic suspension strut which enables use of an extremely small outer tube diameter so that in case there is a need for substitution, this suspension strut can be exchanged for a standard vibration damper. Further, the suction tube arrangement is not acted upon by the internal pressure of the high-pressure chamber.

The invention may provide that the flow connection is arranged in the intermediate wall and has at least one bore hole in the area of the low-pressure chamber for receiving a suction tube.

This embodiment form has the advantage that the flow connection proceeding from the pump chamber to the low-pressure chamber is arranged directly in the intermediate wall and is accordingly no longer influenced by the high pressure of the high-pressure chamber; further, only one suction tube must be received in a bore hole of the intermediate wall.

According to another feature, the flow connection is composed of at least one radially extending bore hole and at least one axially extending bore hole.

An advantageous solution consists in that a stepped bore hole is provided as the bore hole and the suction tube is fixed in the first portion thereof.

Further, the intermediate wall is provided with an annular projection which projects into the low-pressure chamber so as to be sealed. This is advantageous in that the intermediate wall is rigidly constructed up to the pump rod fastening and has a bore hole extending radially in the direction of the pump rod. Proceeding from the low-pressure chamber, a stepped bore hole opens with a smaller diameter into the radial bore hole mentioned above so that only the smaller diameter of the stepped bore hole passes through the area of the adjoining seals and the larger diameter of the stepped bore hole is available to receive the suction tube which is kept short and therefore free of choking. This results in a suspension strut with a small outer tube diameter.

Another advantage consists in that in an installation position in which the piston rod is arranged at the bottom, the suction tube is pressure-compensated and the high pressure in this installation position has no surface to act upon. Should the suspension strut be installed in such a way that the piston rod is arranged at the top, the suction tube and the outer seal are no longer required because the gas can no longer be sucked out of the low-pressure chamber since it is located in the area of the piston rod guide and not in the area of the intermediate wall.

The intermediate wall is fixed in a simple manner in that the area of the radially extending bore hole opening out on the circumferential surface terminates in an annular recess extending at least partially around the circumference. The outer tube is advantageously deformed in the recess in a positive engagement.

A flawless, secure sealing is achieved with a stepped bore hole in that the seals are arranged in the area of the bore hole having the smaller inner diameter. Preferred embodiment examples of the invention are shown schematically in the drawings.

For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
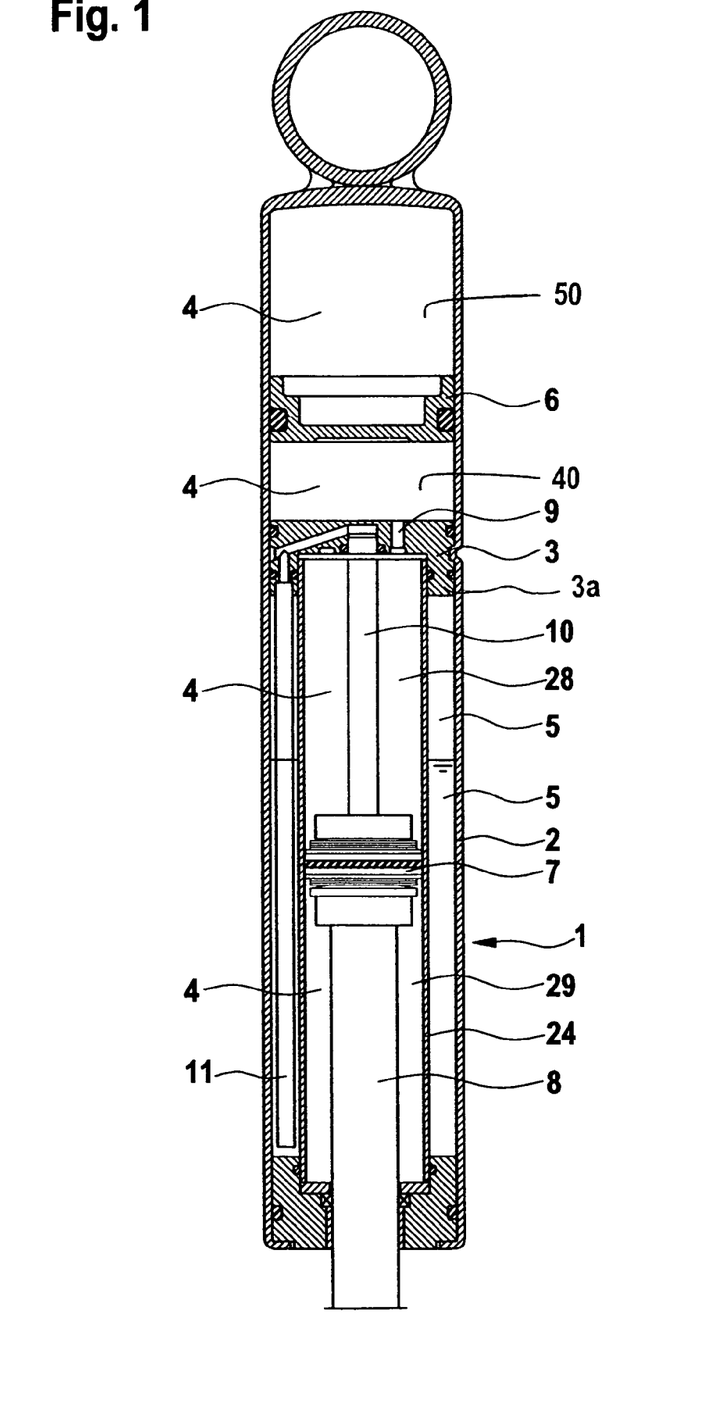
FIG. 1 shows a self-pumping hydropneumatic suspension strut in section.

The suspension strut 1 shown in FIG. 1 substantially comprises the outer tube 2 and the work spaces 28 and 29 which are formed by the damping piston 7 in the work cylinder 24.

The high-pressure chambers 4 comprise the work spaces 28, 29 and the damping medium reservoir 40 and the high-pressure gas chamber 50, these two areas being divided by the dividing piston 6. The intermediate wall 3 divides the low-pressure chamber 5, which is a reservoir, from the high-pressure chamber 4. The damping medium may be oil for example.

Figure 6:
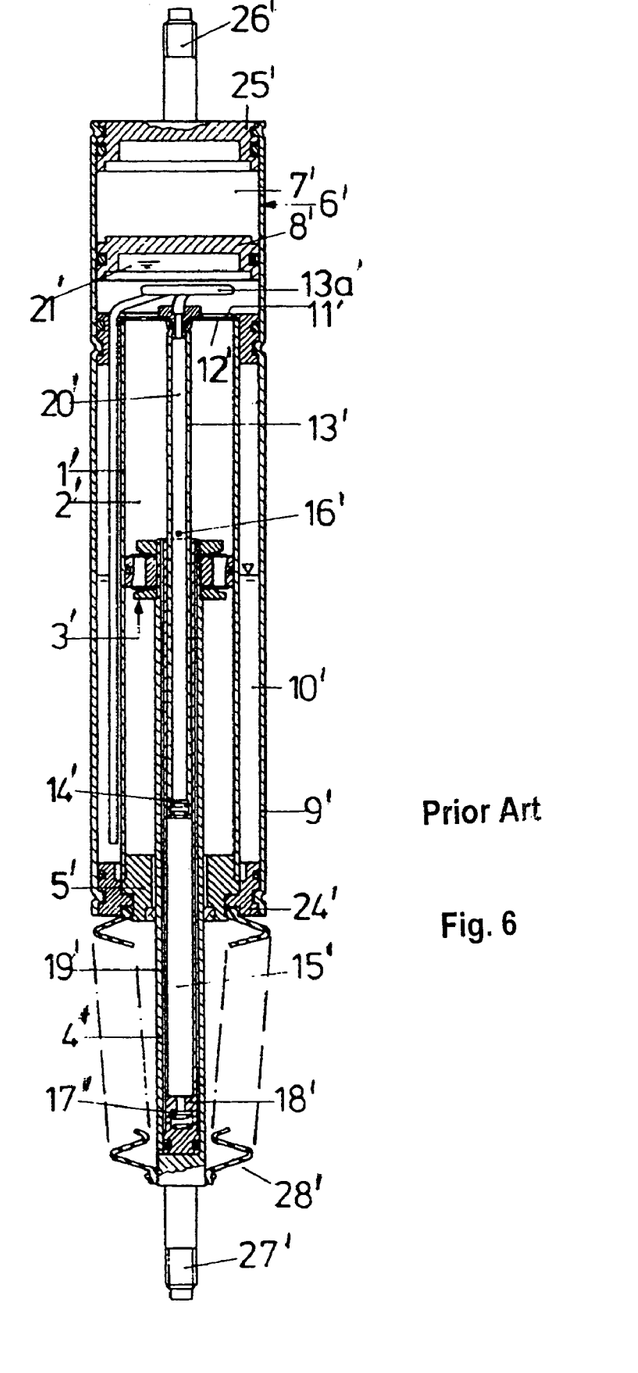
FIG. 6 is a cross sectional view of a prior art suspension strut.
Figure 7:
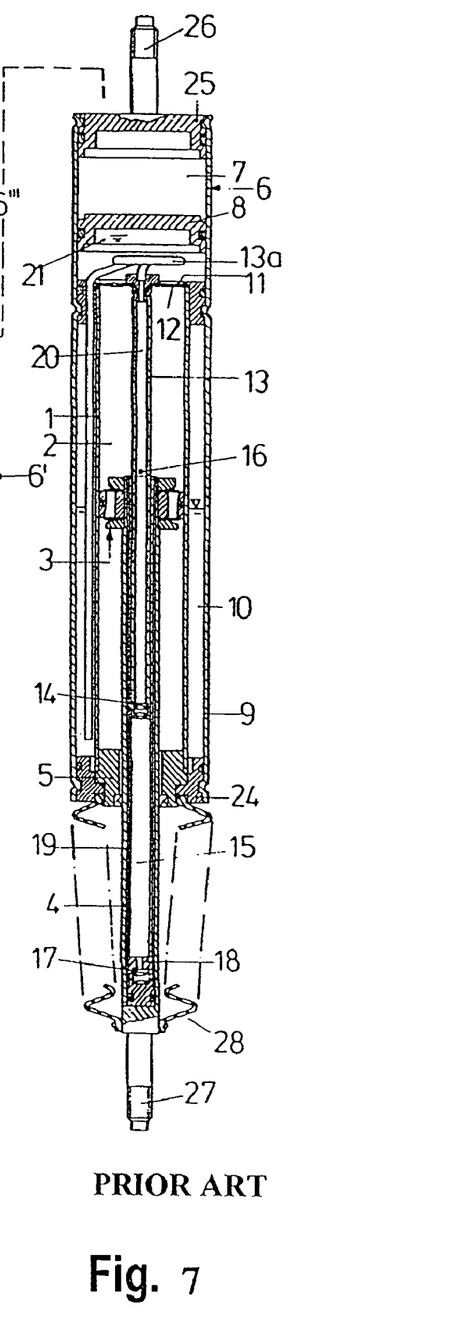
FIG. 7 is a cross sectional view of a prior art shock absorber showing pump rod 13, suction valve 14, and ducts 19.
Figure 8:
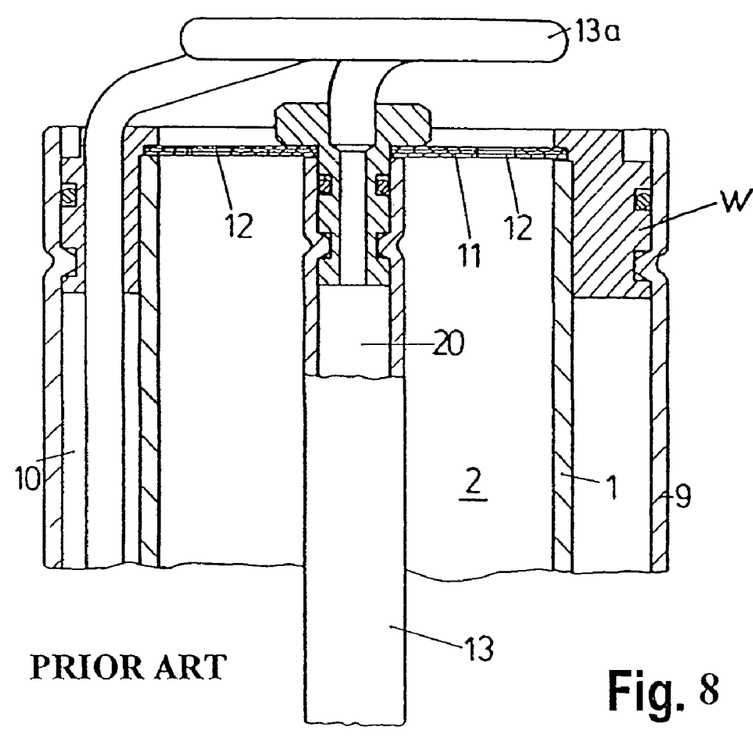
FIG. 8 is an enlarged cross sectional view the prior art shock absorber of FIG. 7 showing wall "W" and suction tube 13a located above wall "W."
Figure 9:
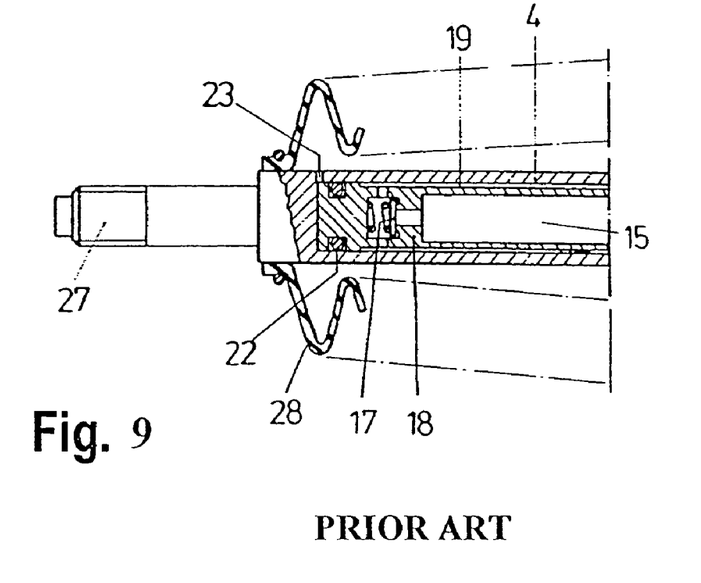
FIG. 9 is an enlarged cross sectional view the prior art shock absorber of FIG. 7.

The self-pumping hydropneumatic suspension strut 1 is shown in FIG. 1 in an installed position in which the piston rod 8 is arranged at the bottom, that is, the piston rod 8 is connected to the wheel suspension, while the outer tube 2 communicates with the vehicle body. The damping medium and pressure gas are accommodated in the low-pressure chamber 5 and in the high-pressure chamber 4. The dividing piston 6 in the high-pressure chamber 4 divides the damping medium from the pressure gas of the high-pressure gas chamber 50. The damping medium is displaced via a connection opening 9 of the intermediate wall 3 in that the piston rod 8 carrying a damping piston 7 springs in and out as the vehicle suspension moves due to road surface changes. A pump rod 10 fastened to the intermediate wall 3 connects a mechanical piston pump to the hollow piston rod 8, this mechanical piston pump being set in operation by unevenness in the road (see U.S. Pat. No. 4,502,672 for an in depth description of a mechanical pump means). The damping medium is pumped out of the low-pressure chamber 5 via a suction tube 11 into the high-pressure chamber 4, the pressure in the high-pressure chamber 4 (work space 28) is increased and the piston rod 8 is pushed outward for controlling the height of the vehicle body. The pumping and regulating mechanism is known from U.S. Pat. Nos. 4,368,878 and 4,502,672. FIG. 6 shows a prior art suspension strut with such a pumping and regulating mechanism. The strut includes a working cylinder 1' with an oil filled working chamber 2' in which a working piston 3' is slidably borne.

The working piston 3' has vacuum and pressure damping valves, respectively, that may be considered as conventional and hence are not characterized in detail. The working piston 3' is located at the end of a hollow piston rod 4' that passes with seal from the working chamber 1'. A piston rod guide and sealing complex is designated by the numeral 5'. A gas spring chamber 6' is connected with the working chamber 2', the chamber 6' having therein a gas cushion 7' that pressurizes the oil in working chamber 2'. The gas spring chamber 6' has a separating piston 8' for separation of the oil from gas cushion 7', the piston being sealingly guided at its periphery. The working chamber 2' is also surrounded by an oil reservoir chamber 10' that is defined by an outer jacket tube 9'. In the oil reservoir chamber 10', there is a free surface between oil and gas. The prior art strut also has a partition 11' between the working chamber 2' and the gas spring chamber 6'. The partition 11' is made as a leaf spring wall in the region of working chamber 2', and presents passage openings 12' for communication of the working chamber 2' with the gas spring chamber 6'. A hollow pump rod 13' is elastically borne on the partition 11', the rod being connected at one end via a pump suction tube 13a' with the oil reservoir chamber 10' below its oil surface, and at its other end, which has a pump suction valve 14', it cooperates with a pump chamber 15' disposed in the hollow piston rod 4' for level regulation. For this, the pump rod 13', as a function of the in and out or back and forth spring motions delivers oil from the reservoir 10' into working chamber 2', while, when the ideal level of the oil is exceeded, oil can flow off from the working chamber 2' through a control opening 16' located in the pump rod 13'. On the end of the pump chamber 15' that is remote from the partition 11' there is a pump discharge valve 17' disposed in a control sleeve 18' located in the piston rod cavity 15' between the piston rod 4' and the pump rod 13', forming passages 19' that lead to the working chamber 2'. The end of control sleeve 18' that faces toward the partition 11' constitutes a control edge for the control opening 16'. The pump suction tube 13a', for connection of the pump rod cavity 20' with the oil reservoir 10' below the surface of the oil, is made yielding with reference to the movements of the partition 11', in that it is constituted as tubular spirals running perpendicular to the axis of the strut, between its fastenings to the partition 11' on the one hand and the oil reservoir 10' on the other. The separating piston 8' has a recess 21' on its face that is turned toward the partition 11', in which recess the pump suction tube 13a' can be received in the disposition of the separating piston 8' in the region of the partition 11'. The two fastenings of pump suction tube 13a' on the partition 11' in the pump rod 13' on the one hand and in the region of the oil reservoir 10' on the other are made as sealed plug connections. The fastening of control sleeve 18' in the piston rod cavity 15' is made as a sealed plug connection, whereby the end of control sleeve 18' that faces away from the partition 11' outside pump discharge valve 17' presents a peripheral seal 22' with reference to the piston rod cavity 15' and is applied frontally against the adjacent front wall of piston rod cavity 15'. which has a vent 23' at the end. The fastening of the region of the partition 11' that closes off the oil reservoir 10' in jacket tube 9' is made as a sealed plug connection, as illustrated. The fastenings of both end closure parts 24' and 25' of the strut in the jacket tube 9' are made as sealed plug connections. For the sake of completeness, it should be mentioned that numerals 26' and 27' designate the two fastening bolts for connection of the suspension strut to parts of the vehicle that are to be joined by it. Moreover, reference character 28' denotes a protective cuff for the issuing end of the piston rod 4'.

Figure 2:
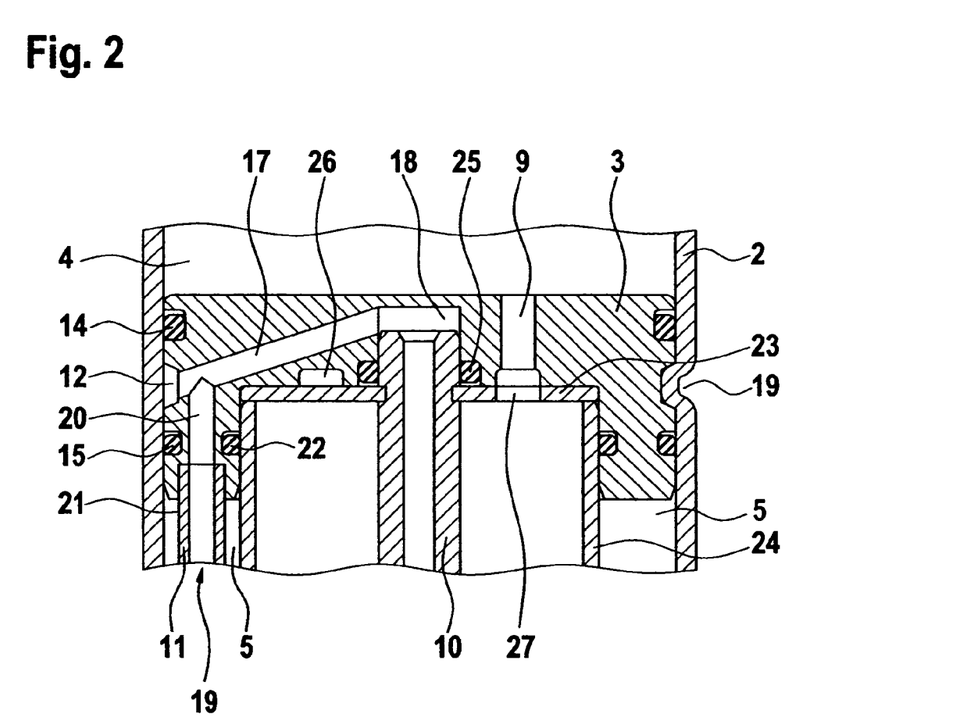
FIG. 2 shows a section in the area of the intermediate wall in enlarged scale.

FIG. 2 shows the intermediate wall 3 in enlarged scale. The intermediate wall 3 is pushed into the outer tube 2 and is secured axially by an annular recess 12, e.g., by means of caulking 13. The caulking 13 is preferably arranged so as to be distributed along the circumference at a plurality of points or can likewise be arranged over the entire circumference. A high-pressure seal 14 is provided above the annular recess 12 and a low-pressure seal 15 is provided below the annular recess 12. The high-pressure seal 14 seals the high-pressure chamber 4 relative to the low-pressure chamber 5; the low-pressure seal 15 is pressure-compensated and only ensures that no pressure gas can be sucked in.

In order to maintain a low overall height of the intermediate wall, a flow connection 17 proceeds from the annular recess 12 into the pump rod receptacle 18. A bore hole 19 which opens into the flow connection 17 with a smaller diameter 20 and whose larger diameter 21 is used for receiving the suction tube 11 is provided in direction of the low-pressure chamber 5. Only the smaller diameter 20 of the bore hole 19 is located in the area of the limiting seals 15 and 22 so that the outer tube 2 can be constructed with a small outer diameter.

The cylinder tube seal 22 likewise seals the high-pressure chamber 4 relative to the low-pressure chamber 5. The pump rod 10 is held in connection to the work cylinder 24 by a disk 23. A pump rod seal 25 seals the high-pressure chamber 4 relative to the low-pressure chamber 5. Due to the annular duct 26, the passage 27 through the disk 23 need not be installed so as to be oriented with respect to position. One or more connection openings 9 can open into the annular channel 26 so that the damping medium can flow through without being choked.

Figure 3:
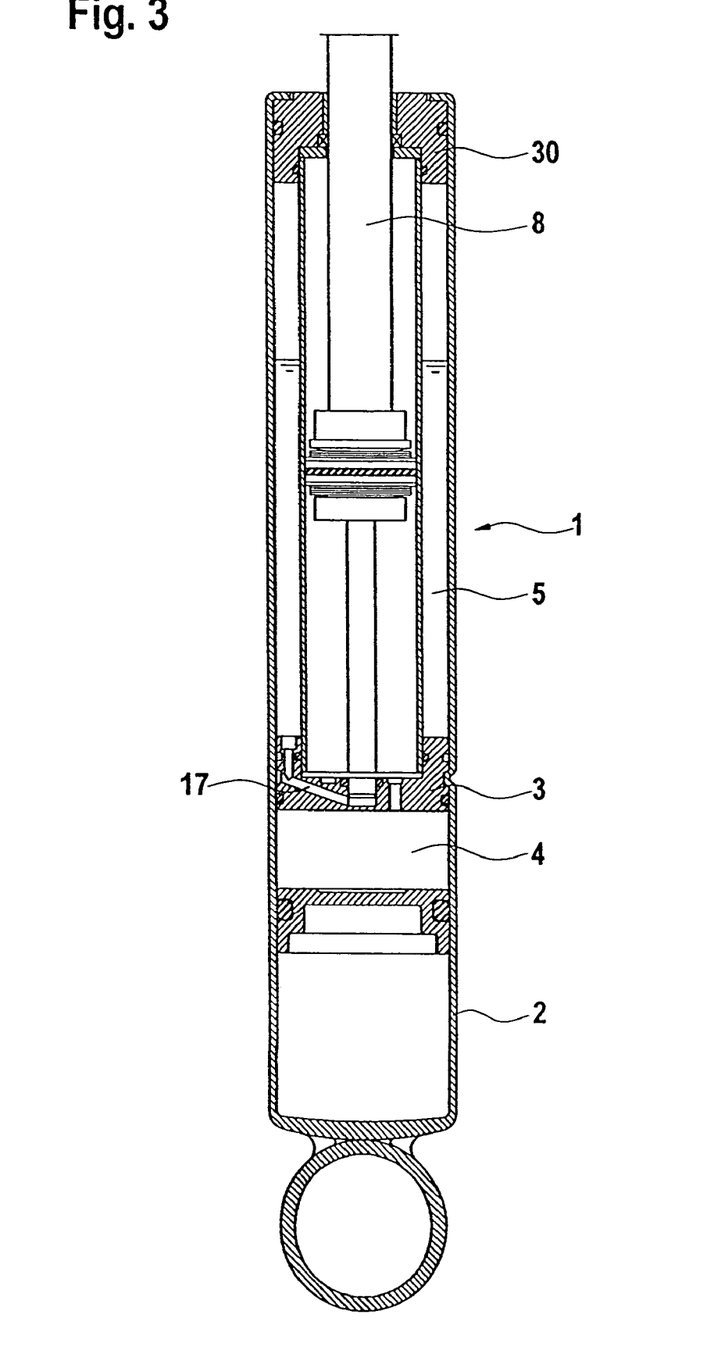
FIG. 3 shows a suspension strut with the piston rod installed at the top.

FIG. 3 shows a suspension strut I in which the piston rod 8 is directed upward, so that the outer tube 2 is connected to the chassis of the vehicle and the piston rod 8 is connected to the body of the vehicle. The intermediate wall 3 divides the high-pressure chamber 4 from the low-pressure chamber 5 again, and the gas of the low-pressure chamber 5 collects in the upper area, that is, in the area of the piston rod guide 30. Accordingly, the intermediate wall 3 requires only the flow connection 17 but not a suction tube as is designated by 11 in FIG. 1.

Figure 4:
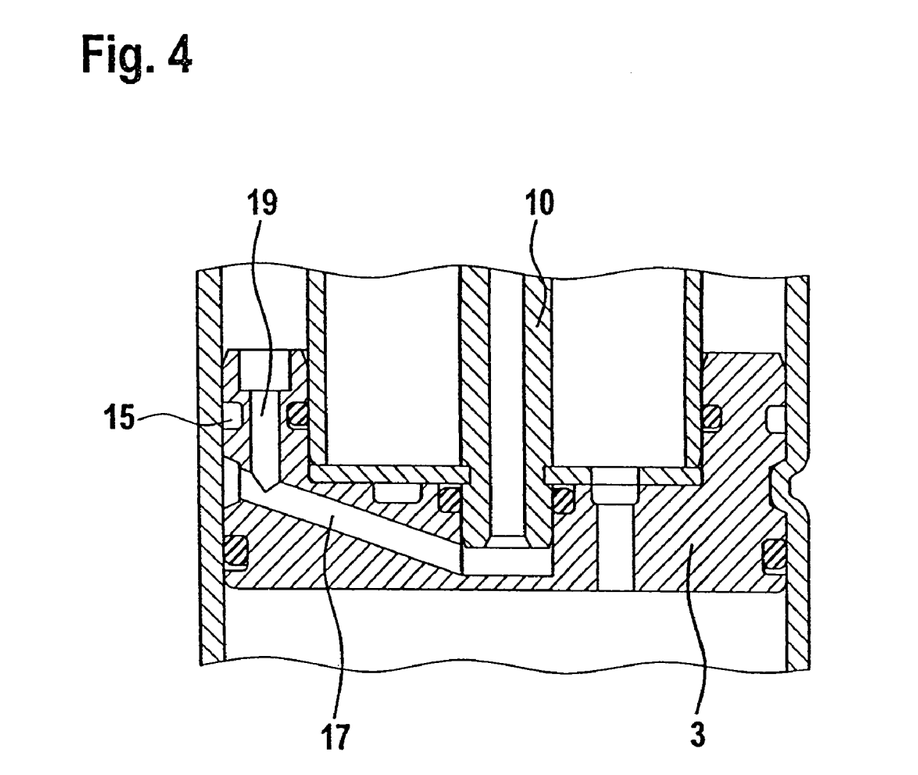
FIG. 4 shows another detail of the intermediate wall in enlarged scale.

FIG. 4 show a detail of the intermediate wall 3 in enlarged scale. The damping medium is sucked into the pump chamber of the pump rod 10 and transported back again, respectively, via the bore hole 19 (without suction tube) and the flow connection 17. A low-pressure seal, designated by 15 in FIG. 2, can be dispensed with in this installation position because no pressure gas can be sucked in.

Figure 5:
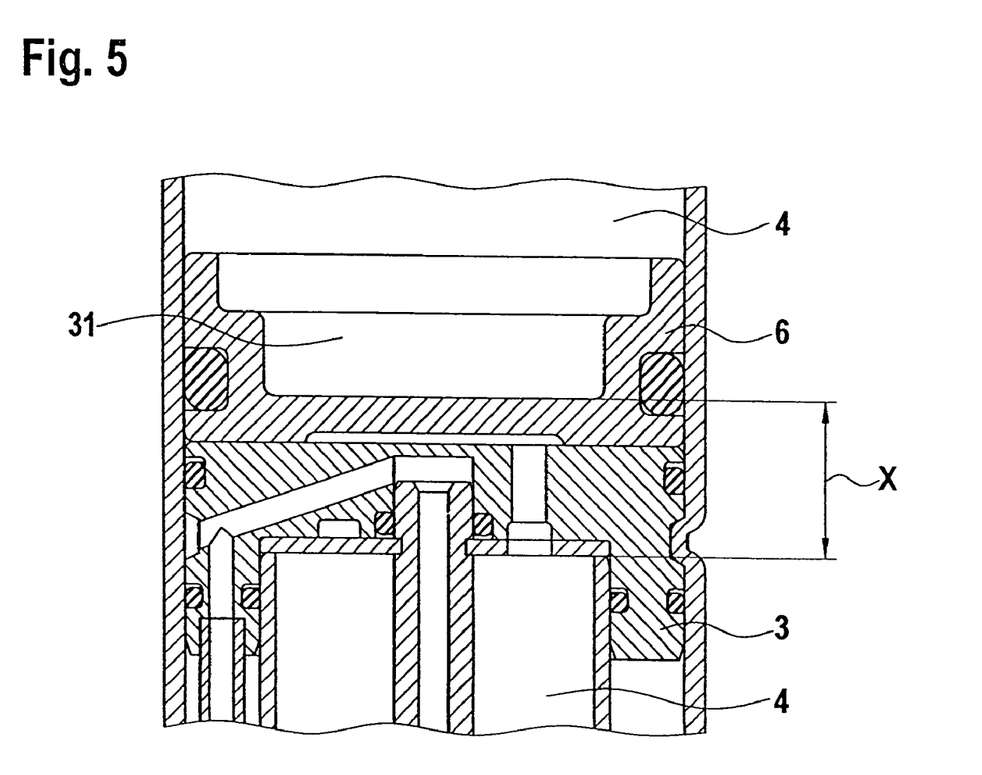
FIG. 5 is a detail of the intermediate wall and dividing piston in enlarged scale.

FIG. 5 shows the intermediate wall 3 in enlarged scale, including the dividing piston 6. The smallest possible dimension X is decisive for maximum utilization of travel and for maximum utilization of the pressure gas volume. In order to optimize this use of the pressure gas volume to the maximum extent, the dividing piston 6 is provided with a bulge 31 on the side of the high-pressure chamber 4 facing the gas space. The intermediate wall (3) is provided with an annular projection (3a) which projects into the low-pressure chamber so as to support a low pressure seal (15).

Also, disclosed is an improved intermediate wall (3) wherein a stepped bore hole is arranged in the annular projection (3a) near seal (15) so that in a first area below seal (15) the bore hole has a larger diameter section compared to a smaller diameter section which is located in a second the area above the seal 15, allowing the outer tube to be constructed with an outer diameter that is reduced by the difference in diameters between the larger and smaller diameter sections.

The invention is not limited by the embodiments described above which are presented as examples only but can be modified in various ways within the scope of protection defined by the appended patent claims.

The Reference Numbers are summarized herein. 1 is a suspension strut. 2 is a outer tube. 3 is a intermediate wall. 4 is a high-pressure chamber. 5 is a low-pressure chamber. 6 is a dividing piston. 7 is a damping piston. 8 is a piston rod. 9 is a connection opening. 10 is a pump rod. 11 is a suction tube. 12 is a annular recess. 13 is a caulking. 14 is a high-pressure seal. 15 is a low-pressure seal. 16 is a cylinder tube seal. 17 is a flow connection. 18 is a pump rod receptacle. 19 is a bore hole. 20 is a small diameter. 21 is a large diameter. 22 is a cylinder tube seal. 23 is a disk. 24 is a work cylinder. 25 is a pump rod seal. 26 is a annular channel. 27 is a passage. 28 is a work space. 29 is a work space. 30 is a piston rod guide. 31 is a bulge.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic suspension strut with internal height control for motor vehicles, comprising:

an outer tube;

a high pressure chamber containing a gas cushion located in a high-pressure gas chamber;

a dividing piston contacting the high pressure gas chamber with the gas cushion and moveable within the outer tube;

an intermediate wall secured axially to the outer tube;

a work cylinder filled with damping medium and under pressure by the gas cushion via the dividing piston and via a connection opening located in the intermediate wall;

a work piston dividing the work cylinder into a first work space and a second work space;

a hollow piston rod supporting the work piston;

a hollow pump rod located within the hollow piston rod for conveying the damping medium out of a low-pressure chamber via a flow connection, wherein the flow connection is arranged within the intermediate wall in order to maintain a low overall height of the intermediate wall and not to protrude from the intermediate wall toward the dividing piston, the flow connection opening out below a surface of the damping medium in the low-pressure chamber, and the flow connection comprising a radially extending bore and an axially extending bore connected to the radially extending bore, and wherein the radially extending bore terminates in an annular recess extending at least partially around a circumferential surface of the intermediate wall.

2. The suspension strut of claim 1, wherein the axially extending bore comprises a stepped bore with a larger diameter section and a smaller diameter section, the flow connection further comprising a suction tube fixed in the larger diameter section of the stepped bore and extending below the surface of the damping medium in the low-pressure chamber.

3. The suspension strut of claim 1, wherein the intermediate wall is provided with an annular projection which projects into the low-pressure chamber so as to support a low pressure seal.

4. The suspension strut claim 1, wherein the outer tube is deformed in a recess in a positive engagement.

5. A self-pumping hydropneumatic suspension strut with internal height control for motor vehicles, comprising:
   an outer tube;
   a high pressure chamber containing a gas cushion located in a high-pressure gas chamber;
   a dividing piston contacting the high pressure gas chamber with the gas cushion and moveable within the outer tube;
   an intermediate wall secured axially to the outer tube;
   a work cylinder filled with damping medium and under pressure by the gas cushion via the dividing piston and via a connection opening located in the intermediate wall;
   a work piston dividing the work cylinder into a first work space and a second work space;
   a hollow piston rod supporting the work piston;
   a hollow pump rod located within the hollow piston rod for conveying the damping medium out of a low-pressure chamber via a flow connection, wherein the flow connection is arranged within the intermediate wall in order to maintain a low overall height of the intermediate wall and not to protrude from the intermediate wall toward the dividing piston, the flow connection comprising a stepped bore with a larger diameter section and a smaller diameter section, and a suction tube fixed in the larger diameter section and extending below a surface of the damping medium in the low-pressure chamber;
   a first seal arranged between the outer tube and the intermediate wall in an area of the smaller diameter section of the stepped bore; and
   a second seal arranged between the intermediate wall and the work cylinder in the area of the smaller diameter section of the stepped bore.

* * * * *